(12) United States Patent
Purushothaman et al.

(10) Patent No.: US 12,487,804 B2
(45) Date of Patent: Dec. 2, 2025

(54) CONTROLLING DEPLOYMENT OF SOFTWARE APPLICATIONS BASED ON EVALUATED RISK OF EXPOSURE OF DESIGNATED TYPES OF DATA

(71) Applicant: Dell Products L.P., Round Rock, TX (US)

(72) Inventors: Suman Perumbully Purushothaman, Bangalore (IN); Bhaskar Sampath Kumar, Mysore (IN); Subramanya Padubidri, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 216 days.

(21) Appl. No.: 18/422,194

(22) Filed: Jan. 25, 2024

(65) Prior Publication Data
US 2025/0244983 A1    Jul. 31, 2025

(51) Int. Cl.
| | | |
|---|---|---|
| *G06F 8/60* | (2018.01) | |
| *G06F 8/71* | (2018.01) | |
| *G06F 9/455* | (2018.01) | |
| *G06F 11/00* | (2006.01) | |
| *G06F 21/00* | (2013.01) | |
| *G06F 21/60* | (2013.01) | |
| *G06F 21/62* | (2013.01) | |

(52) U.S. Cl.
CPC ............... *G06F 8/60* (2013.01); *G06F 21/60* (2013.01)

(58) Field of Classification Search
CPC . G06F 8/60; G06F 21/60; G06F 21/53; G06F 9/5066; G06F 21/577; G06F 8/40; G06F 8/65; G06F 8/61; G06F 11/3034; G06F 11/1461; G06F 11/3058; G06F 9/4856; G06F 9/5077
See application file for complete search history.

(56) References Cited

U.S. PATENT DOCUMENTS

| | | | | |
|---|---|---|---|---|
| 8,549,649 B2 * | 10/2013 | Golomb | .............. | H04L 63/1416 370/468 |
| 12,067,128 B2 * | 8/2024 | Hurwitz | ................ | G06F 16/285 |

OTHER PUBLICATIONS

Microsoft, "Operations Guidance for Team Foundation Server," https://learn.microsoft.com/en-us/previous-versions/bb663036(v=vs.80)?redirectedfrom=MSDN, Feb. 25, 2008, 23 pages.

(Continued)

*Primary Examiner* — Thuy Dao
(74) *Attorney, Agent, or Firm* — Ryan, Mason & Lewis, LLP

(57) ABSTRACT

An apparatus comprises at least one processing device configured to monitor data exchanged with a given piece of software, the monitored data comprising requests and responses exchanged between clients and the given piece of software. The at least one processing device is also configured to generate a data structure characterizing whether designated types of data are included in the monitored data, the generated data structure comprising one or more entries, a given entry comprising information characterizing at least one request or response in which at least of the designated types of data is determined to be included. The at least one processing device is further configured to evaluate a risk of exposure of the designated types of data by parsing the generated data structure, and to control deployment of the given piece of software in a given operating environment based at least in part on the evaluated risk of exposure.

20 Claims, 13 Drawing Sheets

(56) References Cited

OTHER PUBLICATIONS

Github, "Where the World Builds Software," https://github.com/, Accessed Jun. 18, 2021, 16 pages.
GitLab, "GitLab is the Open DevOps Platform," https://about.gitlab.com/, Accessed Jun. 18, 2021, 14 pages.
Atlassian, "Jira Software," https://www.atlassian.com/software/jira, Accessed Jun. 18, 2021, 12 pages.
M. C. Platenius et al., "A Survey of Fuzzy Service Matching Approaches in the Context of On-The-Fly Computing," Proceedings of the 16th ACM SIGSOFT Symposium on Component Based Software Engineering, Jun. 17-21, 2013, 10 pages.

* cited by examiner

400

```
location ~* ^/testapp {
   set $app_name "testapp-web";
   add_header x-sup-rule $app_name always;
   proxy_pass https://{cloud_foundation}$request_uri;
}
```

405

```
http {
        log_format bodylog '$remote_addr - $remote_user [$time_local] '
          '"$request" $status $body_bytes_sent '
          '"$http_referer" "$http_user_agent" $request_time '
          '"$request_body" "$response_body"'
          'appid=$app_name' lua_need_request_body on;

set $response_body "";
        body_filter_by_lua '
          local response_body = string.sub(ngx.arg[1], 1, 1000)
          ngx.ctx.buffered = (ngx.ctx.buffered or "") .. resp_body
          if ngx.arg[2] then
            ngx.var.resp_body = ngx.ctx.buffered
          End
        ';
}
```

410

```
server {
   listen 80;
   server_name <domain_name>;
   location / {
      access_log /var/log/nginx/applicationlog/access.log json_output;
   }
}
```

FIG. 4

FIG. 6

700

| KEYWORD FOR FUZZY LOGIC | KEYWORD REFERRED TO IN RULES |
|---|---|
| CUST_NUM | CUSTOMERNUMBER |
| CUSTOMER_NUMBER | CUSTOMERNUMBER |
| CUSTOMER | CUSTOMERNUMBER |
| CUST_ID | CUSTOMERNUMBER |
| CUSTOMER_ID | CUSTOMERNUMBER |
| SERVICE_TAG | SERIALNUMBER |

705

```
// Check the content type of the response
    if (IsHtml(response))
    {
        // Parse the response into a DOM tree
        HtmlDocument doc = ParseHtml(response);

// Traverse the DOM tree and search for patterns
        Dictionary<string, string> results = FindPatternsInHtml(doc, patterns);
                // apply rule based on matching attribute Bool IsSenitive = Applyrule(attribute)
    }
    else if (IsJson(response))
    {
        // Parse the response into a JSON object
        JObject json = ParseJson(response);

// Traverse the JSON object and search for patterns
        Dictionary<string, string> results = FindPatternsInJson(json, patterns);

// apply rule based on matching attribute
                Bool IsSenitive = Applyrule(attribute)
    }
    else
    {
        // Output an error message
        Console.WriteLine("Unsupported content type.");
    }
```

710

```
pip install fuzzywuzzy
from fuzzywuzzy import fuzz
fuzz.token_set_ratio('Customer_email', 'Custemail')
```

```
HTTP_CODE=$(curl -s -o /dev/null -w "%{http_code}" -X GET https://{security evaluation api endpoint?app_name{appname}&fromdate={from_date}})

if [ $HTTP_CODE = 200 ]

then echo "Sensitive issue detected, stop the deployment" && exit 0 else echo "All good, go ahead and deploy to production"
```

FIG. 11

CONTROLLING DEPLOYMENT OF
SOFTWARE APPLICATIONS BASED ON
EVALUATED RISK OF EXPOSURE OF
DESIGNATED TYPES OF DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Software development processes typically include multiple environments, such as one or more development environments, an integration testing environment, a staging environment, and a production environment. New software code may be created by individual developers or small teams of developers in respective ones of the development environments. The integration environment provides a common environment where software code from the multiple developers is combined and tested before being provided to the staging environment. The staging environment is designed to emulate the production environment and may be used for final review and approval before new software code is deployed in production applications in the production environment. In some cases, software development processes implement continuous integration/continuous deployment (CI/CD) functionality to enable frequent and reliable delivery of code changes for software.

SUMMARY

Illustrative embodiments of the present disclosure provide techniques for controlling deployment of software applications based on an evaluated risk that the software applications will lead to exposure of one or more designated types of data.

In one embodiment, an apparatus comprises at least one processing device comprising a processor coupled to a memory. The at least one processing device is configured to monitor data exchanged with a given piece of software, the monitored data comprising at least one of one or more requests sent from one or more clients to the given piece of software and one or more responses sent from the given piece of software to the one or more clients. The at least one processing device is also configured to generate at least one data structure characterizing whether one or more designated types of data are included in the monitored data, the generated at least one data structure comprising one or more entries, a given one of the one or more entries comprising information characterizing at least one of the one or more requests and the one or more responses in which at least one of the one or more designated types of data is determined to be included. The at least one processing device is further configured to evaluate a risk of exposure of the one or more designated types of data by parsing at least a portion of the generated at least one data structure, and to control deployment of the given piece of software in a given operating environment based at least in part on the evaluated risk of exposure of the one or more designated types of data.

These and other illustrative embodiments include, without limitation, methods, apparatus, networks, systems and processor-readable storage media.

BRIEF DESCRIPTION OF THE DRAWINGS

FIG. 4 shows pseudocode for configuring applications to utilize a reverse proxy and for the reverse proxy to log requests and responses directed to configured applications in an illustrative embodiment.

FIG. 6 shows a table and pseudocode for implementing pattern matching rules for application parameters in an illustrative embodiment.

FIG. 7 shows a sample of keywords used for application parameters and pseudocode for implementing a fuzzy matching algorithm for application parameter values in an illustrative embodiment.

FIG. 11 shows pseudocode for implementing a security check in a software development process in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
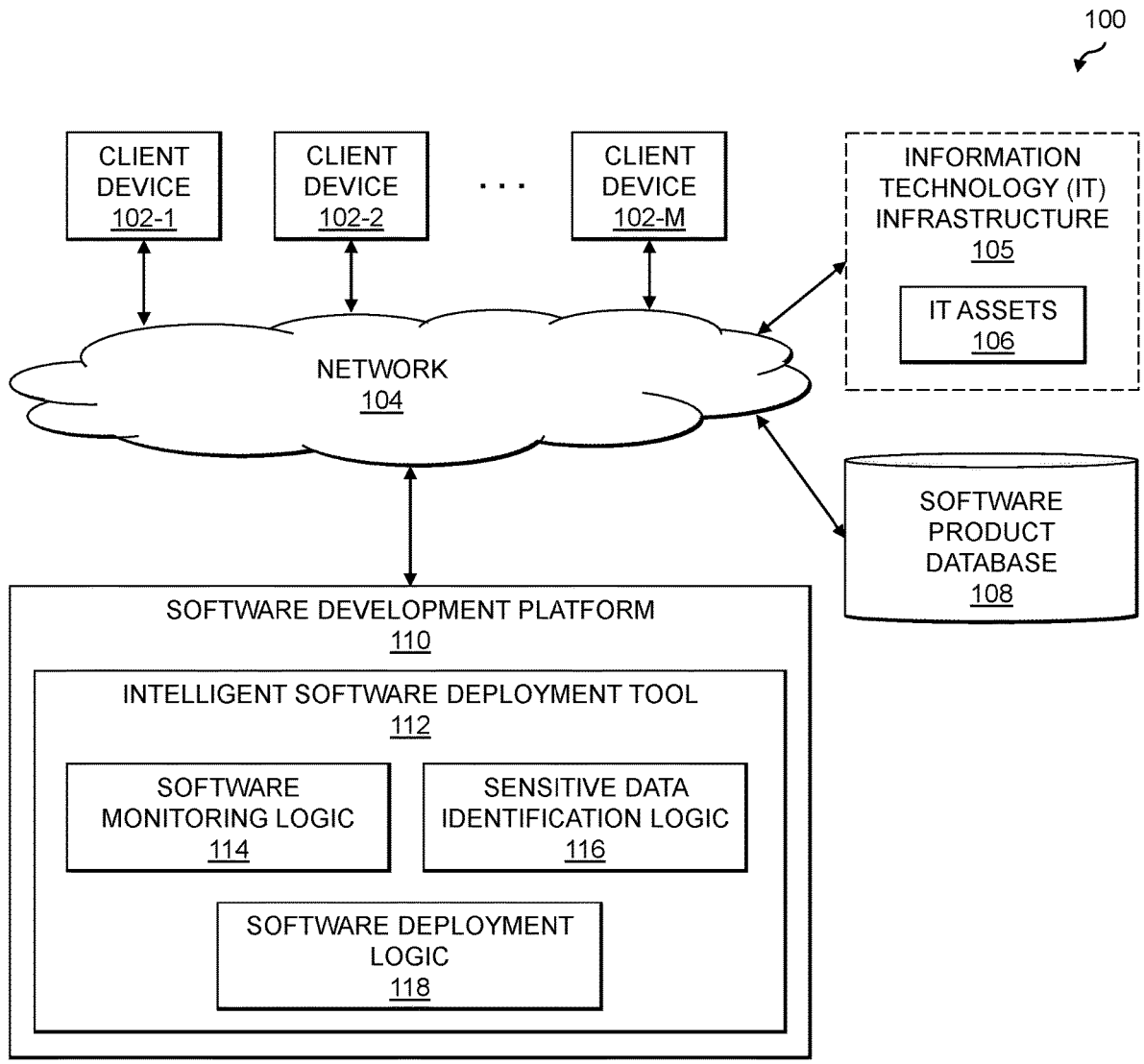
FIG. 1 is a block diagram of an information processing system configured for controlling deployment of software applications based on an evaluated risk that the software applications will lead to exposure of one or more designated types of data in an illustrative embodiment.

FIG. 1 shows an information processing system 100 configured in accordance with an illustrative embodiment. The information processing system 100 is assumed to be built on at least one processing platform and provides functionality for controlling deployment of software applications based on an evaluated risk that the software applications will lead to exposure of one or more designated types of data. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, a software product database 108, and a software development platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the software development platform 110 is used for an enterprise system. For example, an enterprise may subscribe to or otherwise utilize the software development platform 110 for managing application or other software builds which are developed by users of that enterprise (e.g., software developers or other employees, customers or users which may be associated with different ones of the client devices 102 and/or IT assets 106 of the IT infrastructure 105). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The software product database 108 is configured to store and record various information that is utilized by the software development platform 110. Such information may include, for example, information that is collected from multiple data sources and which is processed and stored for use in performing security evaluation for applications or other pieces of software, and for implementing security checks in a software development process before deploying applications or other pieces of software in different types of environments, such as non-production and production environments. The software product database 108 may be implemented utilizing one or more storage systems. The term "storage system" as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the software development platform 110, as well as to support communication between the software development platform 110 and other related systems and devices not explicitly shown.

The software development platform 110 may be provided as a cloud service that is accessible by one or more of the client devices 102 to allow users thereof to manage development and deployment of software products. The client devices 102 may be configured to access or otherwise utilize the software development platform 110 (e.g., to control deployment of software builds on one or more of the IT assets 106, to particular environments such as non-production and production environments, etc.). In some embodiments, the client devices 102 are assumed to be associated with software developers, system administrators, IT managers or other authorized personnel responsible for managing application or other software development for an enterprise. In some embodiments, the IT assets 106 of the IT infrastructure 105 are owned or operated by the same enterprise that operates the software development platform 110. In other embodiments, the IT assets 106 of the IT infrastructure 105 may be owned or operated by one or more enterprises different than the enterprise which operates the software development platform 110 (e.g., a first enterprise provides support for multiple different customers, businesses, etc.). Various other examples are possible.

In some embodiments, the client devices 102 and/or the IT assets 106 of the IT infrastructure 105 may implement host agents that are configured for automated transmission of information with the software development platform 110 regarding development of a particular application or other piece of software. It should be noted that a "host agent" as this term is generally used herein may comprise an automated entity, such as a software entity running on a processing device. Accordingly, a host agent need not be a human entity.

The software development platform 110 in the FIG. 1 embodiment is assumed to be implemented using at least one processing device. Each such processing device generally comprises at least one processor and an associated memory, and implements one or more functional modules or logic for controlling certain features of the software development platform 110. In the FIG. 1 embodiment, the software development platform 110 implements an intelligent software deployment tool 112. The intelligent software deployment tool 112 comprises software monitoring logic 114, sensitive data identification logic 116, and software deployment logic 118. The software monitoring logic 114 is configured to monitor data exchanged with a given piece of software (e.g., an application), where the monitored data comprises requests sent from one or more clients (e.g., client devices 102) to the given piece of software (e.g., running on the IT assets 106 of the IT infrastructure 105, such as within a testing or non-production environment thereof) and responses sent from the given piece of software to the one or more clients. The sensitive data identification logic 116 is configured to generate a data structure characterizing whether one or more designated types of data are included in the monitored data. The generated data structure may comprise a plurality of entries, with each entry comprising information characterizing at least one request or response in which at least one of the one or more designated types of data is determined to be included. The software deployment logic 118 is configured to evaluate a risk of exposure of the one or more designated types of data by parsing the generated data structure, and to control deployment of the given piece of software in a given operating environment based at least in part on the evaluated risk of exposure of the one or more designated types of data. This may include, for example, controlling whether the given piece of software is permitted to be deployed in the given operating environment (e.g., a production environment), stopping execution of a given piece of software which has already been deployed in the given operating environment, etc.

At least portions of the intelligent software deployment tool 112, the software monitoring logic 114, the sensitive data identification logic 116, and the software deployment logic 118 may be implemented at least in part in the form of software that is stored in memory and executed by a processor.

It is to be appreciated that the particular arrangement of the client devices 102, the IT infrastructure 105, the software product database 108 and the software development platform 110 illustrated in the FIG. 1 embodiment is presented by way of example only, and alternative arrangements can be used in other embodiments. As discussed above, for example, the software development platform 110 (or portions of components thereof, such as one or more of the intelligent software deployment tool 112, the software monitoring logic 114, the sensitive data identification logic 116, and the software deployment logic 118) may in some embodiments be implemented internal to the IT infrastructure 105.

The software development platform 110 and other portions of the information processing system 100, as will be described in further detail below, may be part of cloud infrastructure.

The software development platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT assets 106, the software product database 108 and the software development platform 110 or components thereof (e.g., the intelligent software deployment tool 112, the software monitoring logic 114, the sensitive data identification logic 116, and the software deployment logic 118) may be implemented on respective distinct processing platforms, although numerous other arrangements are possible. For example, in some embodiments at least portions of the software development platform 110 and one or more of the client devices 102, the IT infrastructure 105, the IT assets 106 and/or the software product database 108 are implemented on the same processing platform. A given client device (e.g., 102-1) can therefore be implemented at least in part within at least one processing platform that implements at least a portion of the software development platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the software product database 108 and the software development platform 110, or portions or components thereof, to reside in different data centers. Numerous other distributed implementations are possible. The software development platform 110 can also be implemented in a distributed manner across multiple data centers.

Additional examples of processing platforms utilized to implement the software development platform 110 and other components of the information processing system 100 in illustrative embodiments will be described in more detail below in conjunction with FIGS. 12 and 13.

It is to be understood that the particular set of elements shown in FIG. 1 for controlling deployment of software applications based on an evaluated risk that the software applications will lead to exposure of one or more designated types of data is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for controlling deployment of software applications based on an evaluated risk that the software applications will lead to exposure of one or more designated types of data will now be described in more detail with reference to the flow diagram of FIG. 2. It is to be understood that this particular process is only an example, and that additional or alternative processes for controlling deployment of software applications based on an evaluated risk that the software applications will lead to exposure of one or more designated types of data may be used in other embodiments.

In this embodiment, the process includes steps 200 through 206. These steps are assumed to be performed by the software development platform 110 utilizing the intelligent software deployment tool 112, the software monitoring logic 114, the sensitive data identification logic 116, and the software deployment logic 118. The process begins with step 200, monitoring data exchanged with a given piece of software, the monitored data comprising at least one of one or more requests sent from one or more clients to the given piece of software and one or more responses sent from the given piece of software to the one or more clients. Step 200 may include utilizing a reverse proxy with which the given piece of software is registered, the reverse proxy being configured to intercept the one or more requests sent from the one or more clients to the given piece of software and the one or more responses sent from the given piece of software to the one or more clients.

In step 202, at least one data structure is generated characterizing whether one or more designated types of data are included in the monitored data. The generated at least one data structure comprises one or more entries, a given one of the one or more entries comprising information characterizing at least one of the one or more requests and the one or more responses in which at least one of the one or more designated types of data is determined to be included. The data structure may comprise one or more tables or other arrangement of data, including data arranged in at least one data model as described elsewhere herein.

The one or more designated types of data may comprise sensitive information which, if exposed, results in a data breach. The one or more designated types of data may comprise at least one of personally identifiable information (PII) such as customer numbers, asset identification information such as product serial numbers, and financial information such as credit card numbers, bank information, etc. Step 202 may include identifying a presence of one or more attribute values, in bodies of the one or more requests sent from the one or more clients to the given piece of software and the one or more responses sent from the given piece of software to the one or more clients, which correspond to at least one of a set of one or more designated application parameters, and performing pattern matching for the identified one or more attribute values, the pattern matching utilizing a set of rules for evaluating whether the identified one or more attribute values comprise any of the one or more designated types of data. Identifying the presence of the one or more attribute values which correspond to at least one of the set of one or more designated application parameters may comprise applying a fuzzy matching algorithm for a set of keywords associated with the set of one or more designated application parameters. The set of keywords associated with the set of one or more designated application parameters may comprise, for a given application parameter, two or more different keywords which map to the given application parameter.

Figure 2:
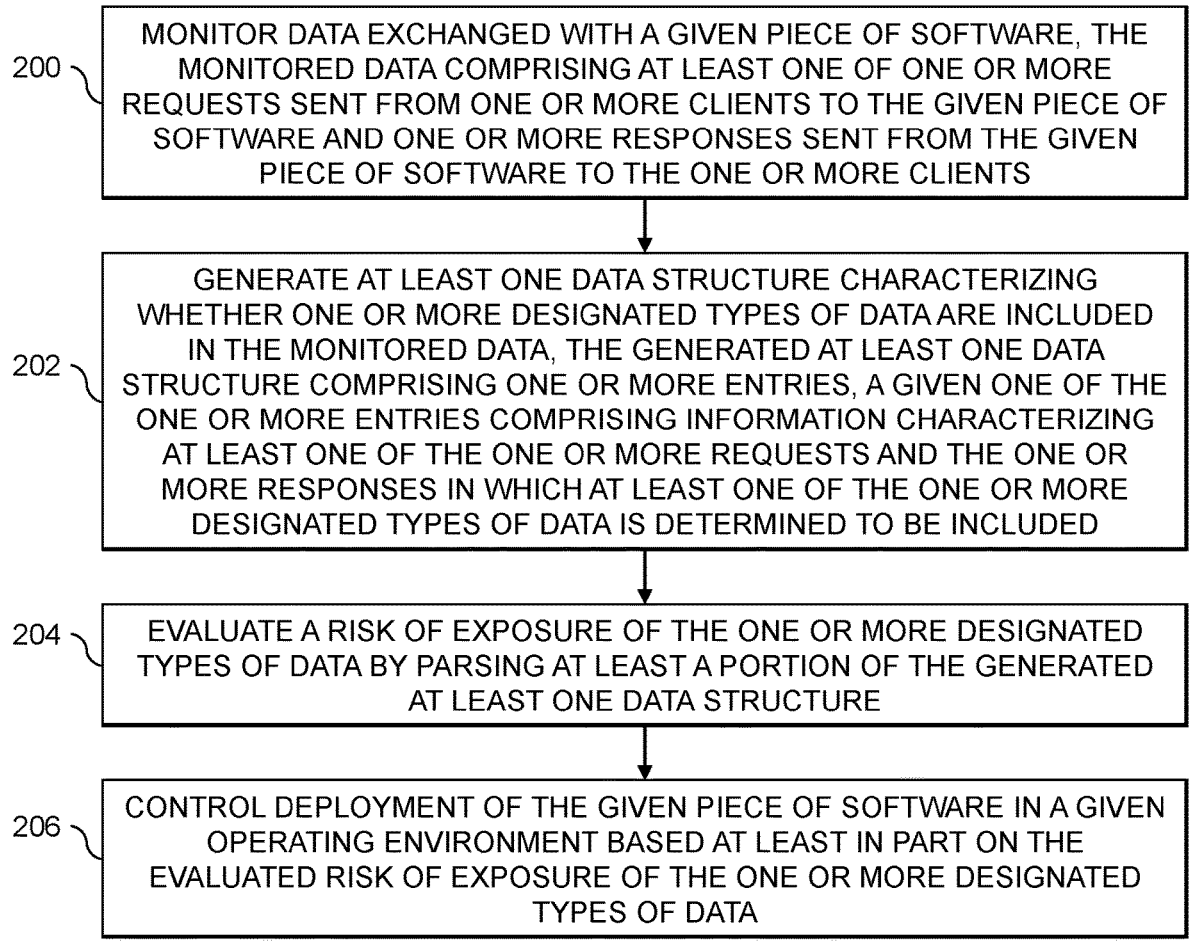
FIG. 2 is a flow diagram of an exemplary process for controlling deployment of software applications based on an evaluated risk that the software applications will lead to exposure of one or more designated types of data in an illustrative embodiment.

The FIG. 2 process continues with step 204, evaluating a risk of exposure of the one or more designated types of data by parsing at least a portion of the generated at least one data structure. In some embodiments, step 204 includes parsing the generated data structure utilizing an application name of the given piece of software and a date parameter which filters the entries of the data structure based on a last commit date of the given piece of software.

In step 206, deployment of the given piece of software in a given operating environment is controlled based at least in part on the evaluated risk of exposure of the one or more designated types of data. Step 206 may comprise preventing deployment of the given piece of software in the given operating environment responsive to determining that the evaluated risk of exposure of the one or more designated types of data exceeds a designated risk threshold. In some embodiments, this may include determining that any of the requests/responses of the given piece of software exposes any of the designated types of information. Step 206 may also or alternatively comprise generating one or more warning notifications responsive to determining that the evaluated risk of exposure of the one or more designated types of data exceeds a designated risk threshold.

In some embodiments, the data exchanged with the given piece of software may be monitored while the given piece of software is running in a first operating environment, and the given operating environment may comprise a second operating environment different than the first operating environment. The first operating environment may comprise a non-production environment and the second operating environment may comprise a production environment. The first operating environment may be accessible to a first set of users trusted by an entity running the given piece of software, and the second operating environment may be accessible to a second set of users not trusted by the entity running the given piece of software. The first operating environment may comprise a private operating environment controlled by an entity running the given piece of software, and the second operating environment may comprise a public operating environment not controlled by the entity running the given piece of software.

An enterprise, organization or other entity may host applications or other software, and allow users to access web pages or other interfaces to utilize functionality of the hosted applications or other software. In some cases, the users accessing such web pages or other interfaces are "external" users, such as customers of the enterprise, organization or other entity. When an enterprise, organization or other entity hosts applications or other software and exposes their functionality to users, including external users, this can raise security concerns relating to data that is exposed by the applications or other software, how such data is used, etc.

Various security products may be used to scan software code and other files to identify viruses or other malicious elements, to identify vulnerabilities, etc. These products can solve some security issues related to the capabilities of applications or other software products. In some cases, security products may require sample data to be set up (e.g., manually) in order to execute testing or scanning. The results of such testing or scanning directly depend on how well the sample data is set up.

In an enterprise, organization or other entity, the structure and composition of software product development teams may change over time. For example, some developers may move between teams which work on different parts of an application or other piece of software, which work on different applications or pieces of software, etc. Even though the software product development teams may strive to follow certain security standards, identifying what data needs to be exposed to clients and what needs to be protected may depend on expert knowledge. For some types of data, it can be critical to ensure that appropriate security safeguards are in place. Such data may include customer identifiers, addresses, emails, credit card numbers, etc. These and other types of data which should have one or more security safeguards in place may be referred to as "sensitive" data or information. In many cases, sensitive data or information can be added on or included in request and response payloads of applications or other software. To safeguard such sensitive data or information, various mechanisms may be used (e.g., encryption, obfuscation, authentication, etc.). It is difficult, however, to keep track of sensitive data or information which may be accidentally or inadvertently exposed, and to track use of sensitive data or information across different applications or other software. Some malicious attacks, for example, use the data that is included in a response from one application or other software response in one or more requests that are sent to the same or different applications or other software. This can lead to data breaches or other unwanted sharing or exposure of the sensitive data or information.

A data breach can be based on different attack patterns, such as direct hypertext transfer protocol (HTTP) hits, server-side forgery attacks, etc. It is important to detect vulnerable endpoints or interfaces of an application or other piece of software, and act proactively to fix such vulnerable endpoints or interfaces, to prevent applications or other pieces of software with such vulnerable endpoints or interfaces from being deployed in certain environments (e.g., in production environments, outside of testing environments, in environments accessible to users that are external to an enterprise as discussed above, etc.).

Illustrative embodiments provide technical solutions for implementing security frameworks with the capability of tracking information or data that is exposed by an application or other piece of software, and for assessing the security risk posed by exposure of that information or data, including "sensitive" data as described in further detail elsewhere herein. The technical solutions advantageously do not require any predefined data set up, and are able to handle input data dynamically. The security framework in some embodiments is able to map code changes in an application or other piece of software with requests/responses to evaluate whether any sensitive data or information is exposed. In some embodiments, the security framework may be deployed to analyze all request and response parameters flowing to an application or other piece of software in a first environment (e.g., a lower or non-production environment), to proactively detect whether the application or other piece of software may expose sensitive data or information before the application or other piece of software is deployed to a second environment (e.g., a higher or production environment). Captured data may be used to identify different application uniform resource locators (URLs), uniform resource identifiers (URIs) or other application endpoints or interfaces to detect any sensitive data or information included therein based on defined rules and pattern matching. The data may advantageously be captured in a lower or non-production environment in order to evaluate security risks before an application or other piece of software gets deployed to a production environment. It should be noted, however, that data may also be captured from applications or other software operating in a production environment.

With the growing number of security attacks and awareness about the importance of data security and various compliances, enterprises, organizations and other entities are prioritizing security and making security an integral part of their growth and protection strategies. An enterprise, for example, may adopt a strong emphasis on authentication, authorization, and access control for enterprise resources. Despite having these measures in different stages, changes in applications or other software that get deployed to production can cause issues due to some sensitive data or information unintentionally being exposed to the outside world. While software development teams may adopt processes and take measures to scan code, run penetration testing, etc., there is still a chance that some parameters which are intended for an application or other piece of software to work smoothly can lead to data leaks because of certain patterns of requests/responses. Attackers may use such patterns to gather sensitive data. Examples of such parameters which can be seen on a web application include: an HTTP response returns a plain text customer number which can then be used by attackers for different malicious activities; a query string that accepts plain text, where attackers can simply use incremental numbers or similar text patterns to look for other data; etc.

In some cases, the exposure of sensitive data or information by an application or other piece of software may have been ongoing (e.g., a data leak may have existed for some time undetected), or may be a result of new changes to the application or other piece of software. Many times, attributes that need to be exposed to the client side (e.g., the browser side for a web application) go through review processes, but there is no automated way to detect accidental, inadvertent, unwanted or otherwise unintentional inclusion of sensitive data or information in HTTP or other types of requests/responses.

The technical solutions described herein, in some embodiments, leverage application or other software code testing environments to detect patterns (e.g., of requests/responses to the application or other software) that can lead to data leaks or other unintentional exposure of sensitive data or information. Once the application or other software is deployed to a testing environment (e.g., a non-production environment), requests and responses directed to that application or other software are collected from a reverse proxy, which acts like a gateway for all interactions between clients or users and the application or other software running in the testing environment. The reverse proxy may be configured to collect the data from multiple applications or other pieces of software that are deployed within the testing environment, and thus can advantageously detect patterns across multiple applications or other pieces of software that could potentially lead to data leaks or other unintentional release of sensitive data or information or data. Once the data is collected via the reverse proxy, it may be processed through a security evaluation engine which logs any detected sensitive data or information in a data store. This information can then be used to determine if the source code for the application or other software can be elevated or deployed into a higher environment (e.g., a production environment). Such checks may be implemented via logic that is integrated with a software development and IT operations (DevOps) pipeline.

Conventional approaches to evaluating security of applications or other software are concentrated on limited manual data set up and scanning that data to identify security issues. The output of such scans is thus dependent on how well the data is set up for testing. Further, some conventional approaches provide functionality for scanning code to identify viruses and vulnerabilities. When there is an agile software product development team working on an application or other piece of software, and where members of the team may change continuously, there is always a possibility of some data elements being introduced into requests/responses handled by the application or other piece of software (e.g., one or more APIs or endpoints thereof) which could carry sensitive data or information. Such data elements are a target for attackers, and may lead to data breaches or other unintentional exposure of the sensitive data or information.

Figure 3:
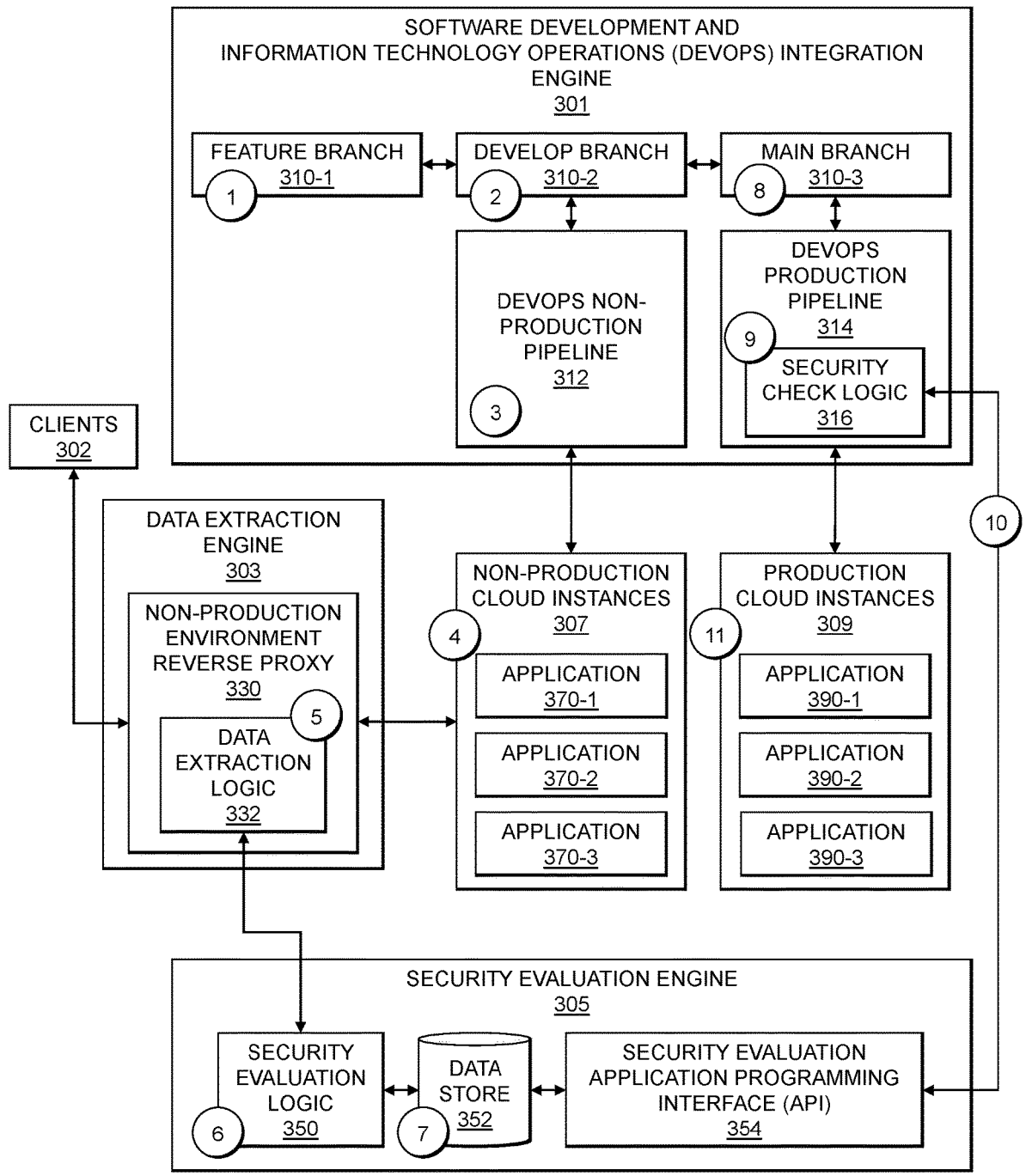
FIG. 3 shows a system implementing an intelligent software deployment framework in an illustrative embodiment.

FIG. 3 shows a system 300 implementing an intelligent software deployment framework (e.g., the intelligent software deployment tool 112 of the software development platform 110). The system 300 includes a DevOps integration engine 301, a data extraction engine 303 and a security evaluation engine 305. The DevOps integration engine 301 implements various source code management and continuous integration and continuous delivery/continuous deployment (CICD) software development pipelines. In the FIG. 3 example, this includes a feature branch 310-1, a develop branch 310-2 associated with a DevOps non-production pipeline 312, and a main branch 310-3 associated with a DevOps production pipeline 314 implementing security check logic 316. The DevOps non-production pipeline 312 controls deployment of applications 370-1, 370-2 and 370-3 (collectively, applications 370) in one or more non-production cloud instances 307 (e.g., a testing or other non-production environment). The DevOps production pipeline 314 controls deployment of applications 390-1, 390-2 and 390-3 (collectively, applications 390) in one or more production cloud instances 309 (e.g., a production environment). The DevOps integration engine 301 may set up source code management and CICD pipelines with a source code repository, such as GitLab, GitHub, etc. Software development teams use these tools to maintain the source code for applications, and for deploying applications to different environments (e.g., testing or other non-production environments, production environments, etc.). The security check logic 316 implemented by the DevOps production pipeline 314 is responsible for deciding whether code can be promoted to a production environment (e.g., the production cloud instances 309) based on the data that is extracted and analyzed in lower non-production environments (e.g., the non-production cloud instances 307).

The data extraction engine 303 implements a non-production environment reverse proxy 330. Data traffic to/from the applications 370 running in the non-production cloud instances 307 and one or more clients 302 are routed through the non-production environment reverse proxy 330 (e.g., requests/responses for the applications 370 are configured through the non-production environment reverse proxy 330). The non-production environment reverse proxy 330 implements data extraction logic 332, which is configured to capture the requests and responses of HTTP or other traffic flowing through the non-production environment reverse proxy 330.

The security evaluation engine 305 implements security evaluation logic 350, a data store 352 and a security evaluation API 354 that is exposed to the security check logic 316 implemented by the DevOps production pipeline 314. The security evaluation logic 350 is configured to receive data collected or extracted by the data extraction logic 332, and to detect sensitive data patterns in the extracted data. Such sensitive data patterns are flagged and stored in the data store 352. This data is then used by the DevOps production pipeline 314 to decide whether an application (e.g., one or more of the applications 370) can be promoted to a production environment (e.g., as one or more of the applications 390). To do so, the security check logic 316 of the DevOps production pipeline 314 may call the security evaluation API 354 of the security evaluation engine 305.

A sequence of operation of the intelligent software deployment framework of system 300 will now be described.

1. Developers work on the feature branch 310-1.
2. Once the feature branch 310-1 is complete, code is merged to the develop branch 310-2.
3. The DevOps non-production pipeline 312 associated with the develop branch 310-2 executes and deploys the code to non-production instances of the application (e.g., as one or more of the applications 370 on the non-production cloud instances 307).
4. Users or clients 302 try to access the applications 370 through the non-production environment reverse proxy 330.
5. The data extraction logic 332 set up on the non-production environment reverse proxy 330 extracts request and response data.
6. The extracted request and response data, also referred to as the collected information, is then passed to the security evaluation logic 350 of the security evaluation engine 305, which is responsible for identifying any sensitive data or information in the extracted request and response data.
7. The outcomes of the security evaluations by the security evaluation logic 350 are persisted in the data store 352.
8. Once the code is ready to be deployed to production, it is merged to the main branch 310-3.
9. The code runs through DevOps steps set up for production in the DevOps production pipeline 314, which includes running the security check logic 316.
10. The security check logic 316 invokes the security evaluation API 354 to determine if there are any sensitive attributes being added in the latest code merged to the main branch 310-3. If there is any sensitive information captured, the DevOps production pipeline 314 may stop the execution and not allow the code to be deployed to the production environment (e.g., the production cloud instances 309). The DevOps production pipeline 314 may trigger further actions, such as generating and delivering notifications to software developers indicating the reasons why the code was not allowed to be deployed to the production environment.
11. If there is no sensitive information captured, the DevOps production pipeline 314 allows the code to be deployed to the production environment (e.g., as one or more of the applications 390 running in the production cloud instances 309).

It should be noted that, in some embodiments, the DevOps production pipeline 314 may allow code that has sensitive data or information captured to be deployed to a production environment, but with warnings or after an authorized user (e.g., a software developer, a system administrator or manager) has received notifications indicating the captured sensitive information and has activated a security check override.

Details regarding implementation of various components of the intelligent software deployment framework of system 300 will now be described. Some enterprises may utilize a micro frontend architecture. The micro frontend architecture spreads functionalities into multiple applications, so consolidating and routing requests to the right applications requires use of a reverse proxy. The data extraction engine 303 implements the non-production environment reverse proxy 330, which is responsible for forwarding requests to respective web servers for the different applications 370, and for serving responses. The data extraction logic 332 collects the request and response data, and sends it to the security evaluation engine 305 for evaluating data sensitivity. FIG. 4 shows pseudocode for configuring applications and a reverse proxy. In the example of FIG. 4, the application is a cloud application called "testapp" and the pseudocode 400 shows the set up for routing required for the application, including the variable 'set $app_name "testapp-web";' which is used to link requests with the particular application instance. The pseudocode 405 sets up logging for the request and response body, and the pseudocode 410 configures logging on the web servers hosting the application. The same logs may be dumped to a database as well.

The security evaluation engine 305 is responsible for identifying sensitive data or information in the data extracted by the data extraction logic 332, and for flagging the requests/responses which are included in the sensitive data or information. To identify key parameters used in an application which may be considered "sensitive" data or information, commonly used keywords across an organization, enterprise or other entity (or across the scope of an application or related set of applications) are identified. These keywords are used to perform fuzzy matching with the data extracted from the requests/responses that pass through the non-production environment reverse proxy 330 and which are received at the security evaluation engine 305 via the data extraction logic 332. The identified keywords and corresponding values will then go through pattern matching rules to detect possible leakage of sensitive data or information. For example, customer identifiers (e.g., customer ID) may be integer values, and any such parameter with an integer can lead to fraud attacks since attackers would be able to simply increment the number and try with different requests.

Figure 5:
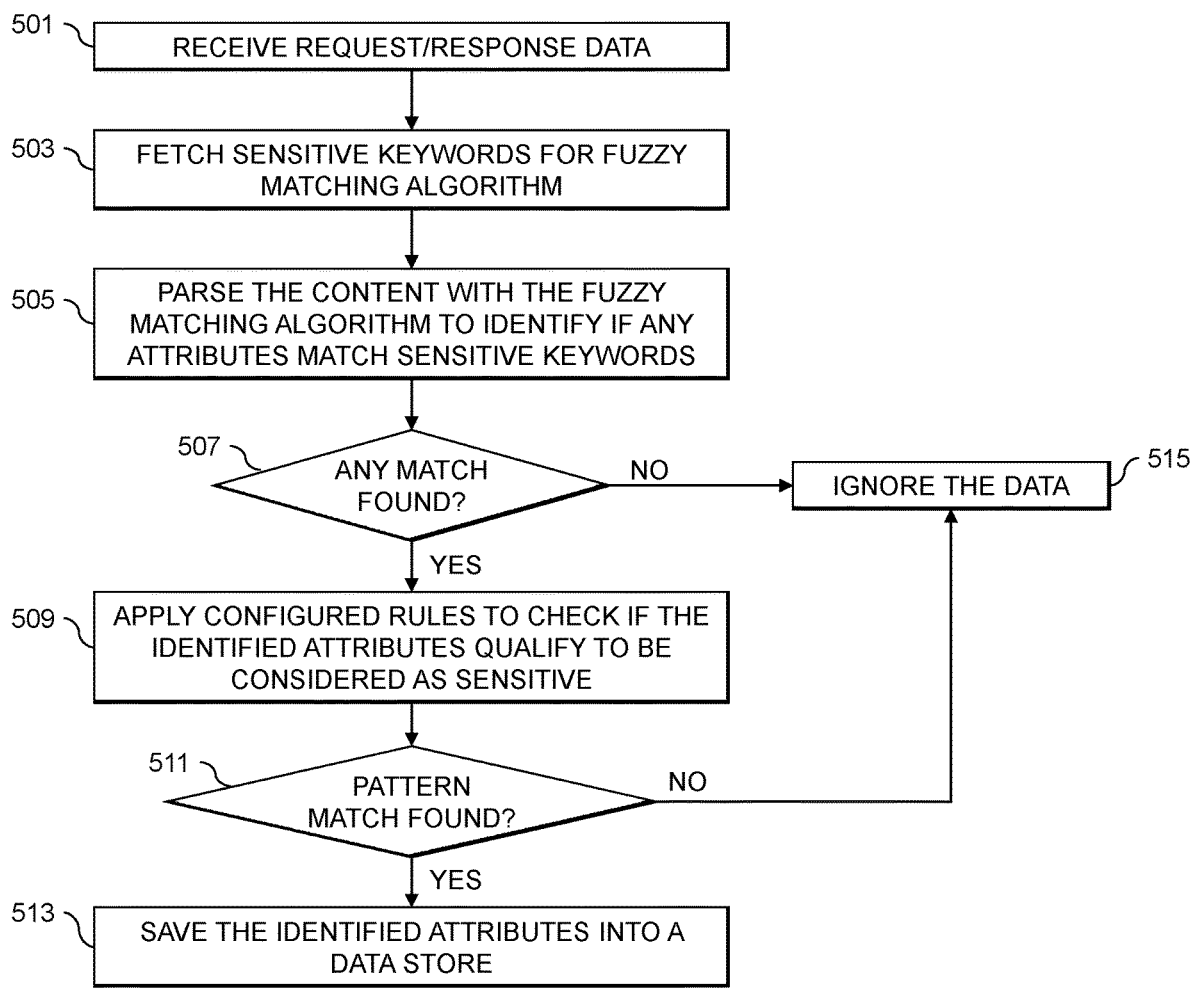
FIG. 5 shows a process flow for evaluating a security risk of data exchanged in requests and responses directed to a configured application in an illustrative embodiment.

FIG. 5 shows a process flow 500 of a sequence of events performed while executing the security evaluation logic 350 of the security evaluation engine 305. The process flow 500 begins in step 501 with receiving request/response data (e.g., from the data extraction logic 332). In step 503, sensitive keywords are fetched for a fuzzy matching algorithm. In step 505, the content received in step 501 is parsed using the fuzzy matching algorithm to identify if any attributes match sensitive keywords. In step 507, a determination is made to whether any match is found. If the result of the step 507 determination is yes, the process flow 500 proceeds to step 509 where configured rules are applied to check if the identified attributes qualify to be considered as sensitive. In step 511, a determination is made as to whether any pattern match is found. If the result of the step 511 determination is yes, the process flow 500 proceeds to step 513 where the identified attributes are saved to the data store 352. If the result of either the step 507 or step 511 determination is no, the data is ignored in step 515.

To identify commonly used parameters and sensitive data or information, rules can be defined with patterns. For example, an organization, enterprise or other entity may typically use customer numbers with a certain pattern. FIG. 6 shows a table 600 illustrating some example patterns for different parameters, including customer numbers, asset identifiers and credit card numbers. FIG. 6 also shows pseudocode 605 for setting up pattern matching rules. In the process flow 500, the security evaluation engine 305 will parse through the request/response bodies and identify potential attributes which may be sensitive in nature in step 505. To do so, a list of keywords that are commonly used across the organization, enterprise or other entity is maintained (and fetched in step 503). Fuzzy logic is applied so that any similar parameters can be identified in step 505. FIG. 7 shows a table 700 of sample keywords which may be configured in a keyword store for implementing the fuzzy matching algorithm, including columns for keywords in the fuzzy logic and their mapping to keywords referred to in the pattern matching rules (e.g., set up as shown in pseudocode 605). Once the fuzzy matching algorithm identifies attributes, the security evaluation engine 305 will fetch the mapped keyword from the keyword store (e.g., from the "keyword referred to in rules" column of the table 700), with that mapped keyword being used to parse the rule to check the data patterns on the request/response data received in step 501. FIG. 7 also shows pseudocode 705 for applying the fuzzy matching algorithm. In the pseudocode 705, "FindPatternsInHtml" and "FindPatternsInJson" are examples of finding patterns in a request/response body and may utilize any suitable pattern matching algorithm. The pseudocode 710 of FIG. 7 shows an example pattern matching algorithm "fuzzywuzzy" which returns a similarity score that can be used to determine if there are any sensitive parameters being used in a request or response payload. The information which is considered "sensitive" and the way in which sensitive information is referred to may differ from one organization to another. The technical solutions described herein provide a framework with configuration capability for storing sensitive data or information keywords and mappings to provide flexibility for what different organizations, enterprise or other entities define or consider sensitive, and provide the ability to detect different ways in which the sensitive data or information may be referred to.

Figure 8:
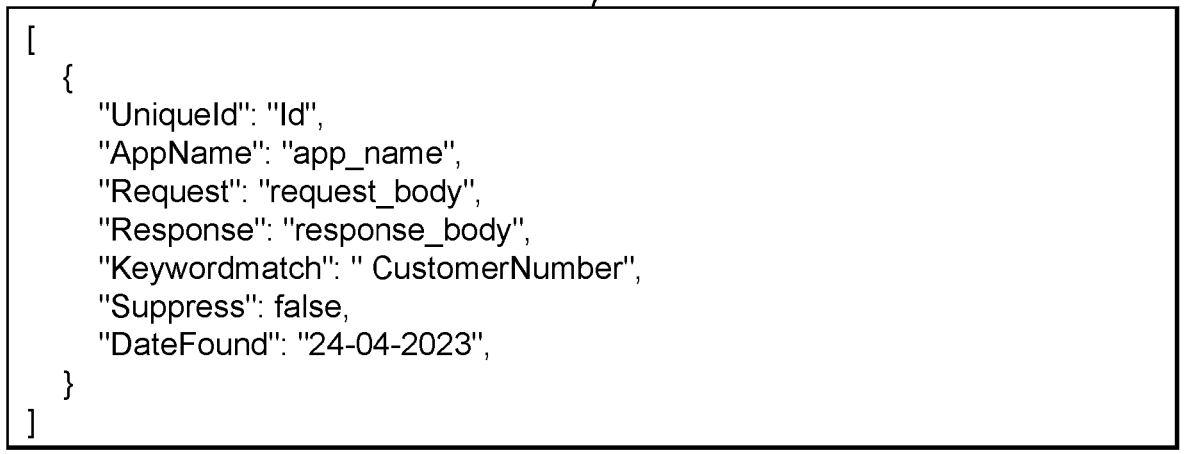
FIG. 8 shows pseudocode of a data model utilized to log sensitive data or information detected in requests and responses directed to a configured application in an illustrative embodiment.

After the data is parsed through the security evaluation logic 350, if any parameters are marked as vulnerable, the security evaluation engine 305 will persist such parameters and associated details in the data store 352. FIG. 8 shows pseudocode 800 for a data model which may be used to persist such information in the data store 352. The data model may include information such as the parameter, its associated application, whether it is present in a request or response body, the keyword match for the parameter, whether that parameter is suppressed (e.g., encrypted, obfuscated, etc.), the date the pattern is found, etc.

The security evaluation engine 305 provides the security evaluation API 354 to integrate and access any requests/responses that are logged as including sensitive data or information. The security evaluation API 354 is used to integrate with the DevOps production pipeline 314 and for implementing security check logic 316 before code can be deployed to a production environment (e.g., the production cloud instances 309). In some embodiments, the security evaluation API 354 takes as input an application name (ApplicationName) and date (FromDate) parameters. Based on these parameters, the security evaluation API 354 will filter the data from the data store 352 and provide any relevant details back to the security check logic 316 (e.g., indicating whether the application has any flagged pattern matches in some designated time range specified by the FromDate parameter).

Figure 9:
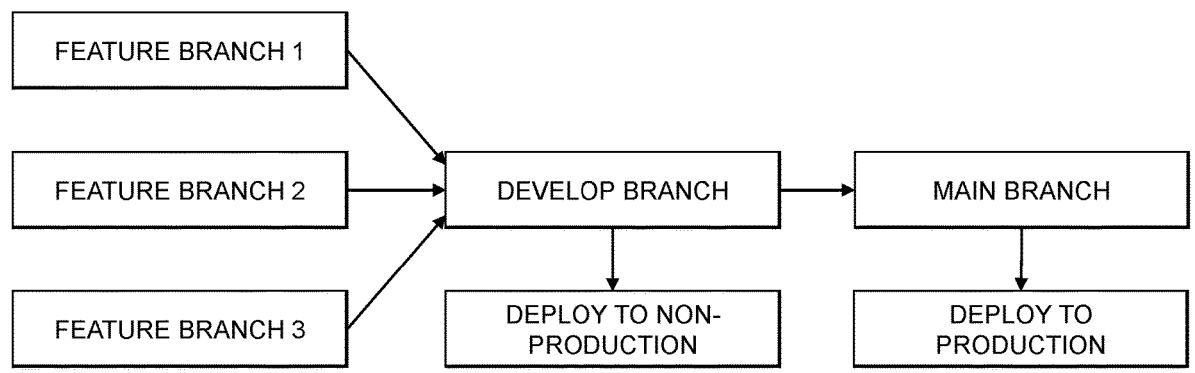
FIG. 9 shows a branch view of a software development and a continuous integration and continuous deployment pipeline in an illustrative embodiment.

The DevOps integration engine 301 may work in conjunction with a software development and CICD pipeline. Application teams may use different code branches to push code changes and deploy an application. Developers use different branches, and merge the code to a main branch once it is ready for deployment. FIG. 9 shows a high level branch view 900 of software development. In a first step, developers work on respective feature branches. In a second step, once a feature completes on one of the feature branches, the developers merge the code for that feature branch to the develop branch. In a third step, the code gets deployed to a non-production environment in one or more non-production application instances. In a fourth step, once testing is completed in the non-production environment, the developers merge the code to the main branch. In a fifth step, the code gets deployed to a production environment in one or more production application instances. When an application gets deployed to non-production or production environments, the DevOps pipeline has access to the application name defined in a configuration file. The same application name is updated in the reverse proxy (e.g., the non-production environment reverse proxy 330). The security check logic 316 is introduced as one of the stages or processes that is executed while code is being deployed to a production environment.

Figure 10:
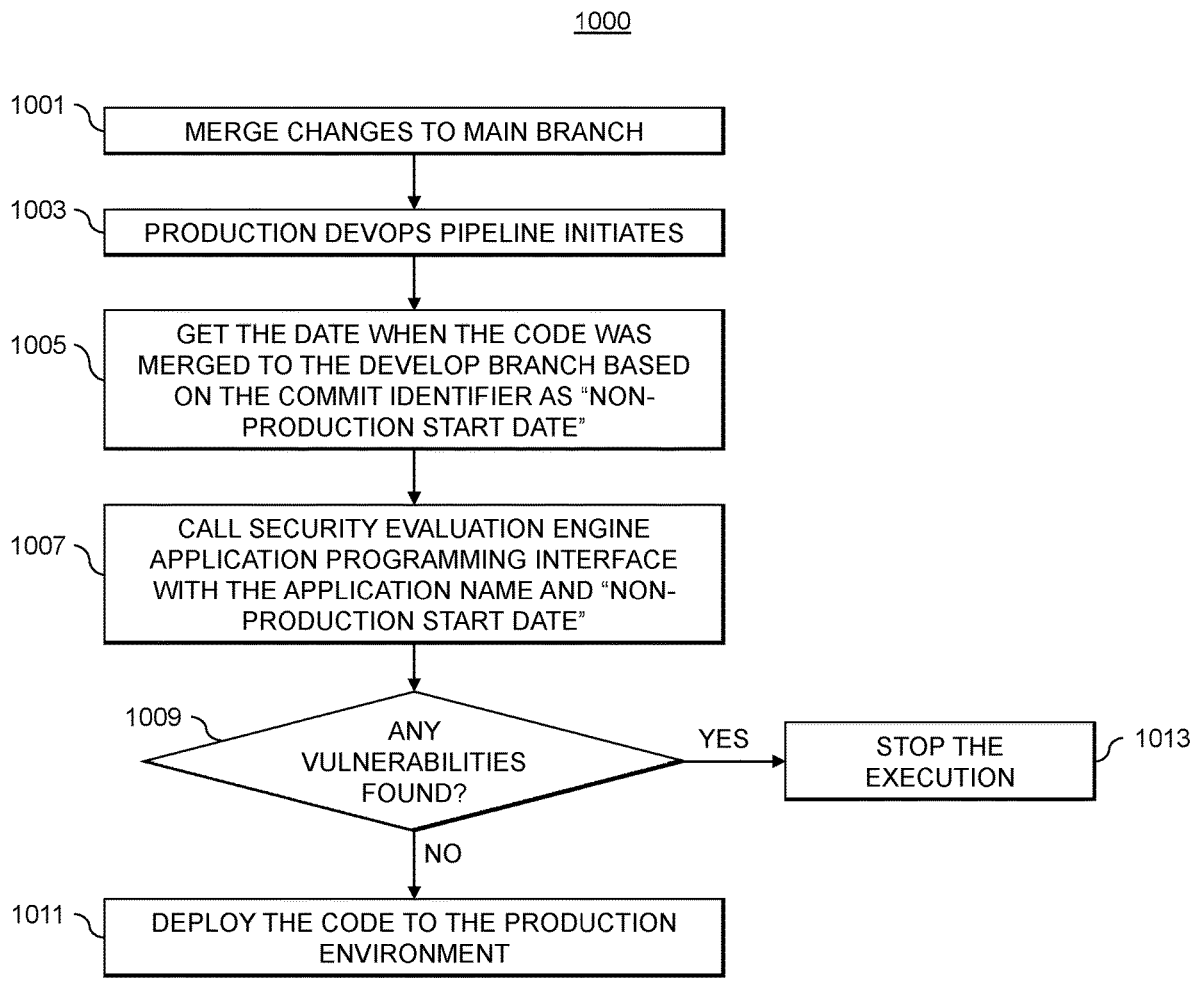
FIG. 10 shows a process flow for implementing security checks in a software development process in an illustrative embodiment.

FIG. 10 shows a process flow 1000 of a sequence of events for the DevOps pipeline. In step 1001, changes are merged from the develop branch to the main branch. In step 1003, the DevOps production pipeline initiates. In step 1005, the date when the code was merged to the develop branch is determined based on the commit identifier (commit ID) and is set as the "non-production start date." In step 1007, the security evaluation API 354 is called with the application name and the "non-production start date" value. In step 1009, a determination is made as to whether any vulnerabilities are found, where a vulnerability may include a pattern match for data that is considered to be sensitive and which may be exposed in requests/responses of the application. If the result of the step 1009 determination is no, the process flow 1000 proceeds to step 1011 where the code is deployed to the production environment. If the result of the step 1009 determination is yes, the process flow 1000 proceeds to step 1013 where the execution is stopped and the code is not deployed to the production environment. In some embodiments, step 1013 includes generating and delivering notifications indicating which vulnerabilities were found, and providing interface features allowing for an authorized user to override the execution stop and allow the code to be deployed to the production environment. FIG. 11 shows pseudocode 1100 of a new stage introduced in the "main" DevOps pipeline to invoke the security evaluation API 354.

The technical solutions advantageously provide a framework for evaluating the requests and responses for an application or other piece of software to detect any sensitive information that is exposed in such requests and responses. The framework can advantageously perform such detection while the application or other piece of software is running in a testing or other non-production environment, and can prevent the application or other piece of software from being deployed to a production environment in the event that sensitive information is detected in the requests or responses while the application or other piece of software is being tested or otherwise run in a non-production environment. Thus, the technical solutions can reduce or eliminate any data leaks that might occur in the production environment. It should be noted, however, that the framework's functionality for detecting any sensitive information that is exposed in requests and responses of an application or other piece of software may be performed while the application or other piece of software is running in a production environment, though in such cases the detection is reactive and can detect potential data leaks while not necessarily preventing the potential data leaks.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for controlling deployment of software applications based on an evaluated risk that the software applications will lead to exposure of one or more designated types of data will now be described in greater detail with reference to FIGS. 12 and 13. Although described in the context of system 100, these platforms may also be used to implement at least portions of other information processing systems in other embodiments.

Figure 12:
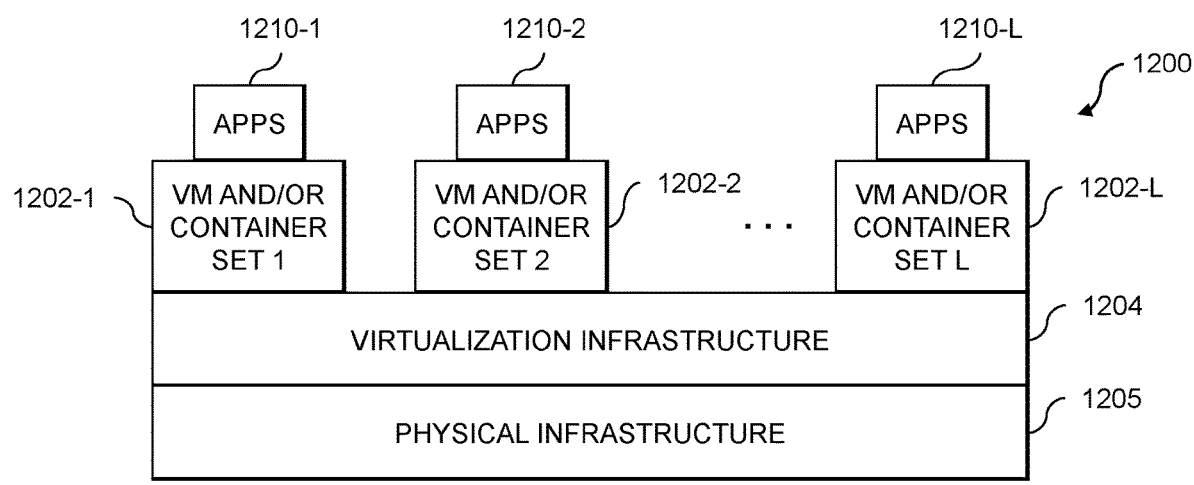
FIGS. 12 and 13 show examples of processing platforms that may be utilized to implement at least a portion of an information processing system in illustrative embodiments.
Figure 13:
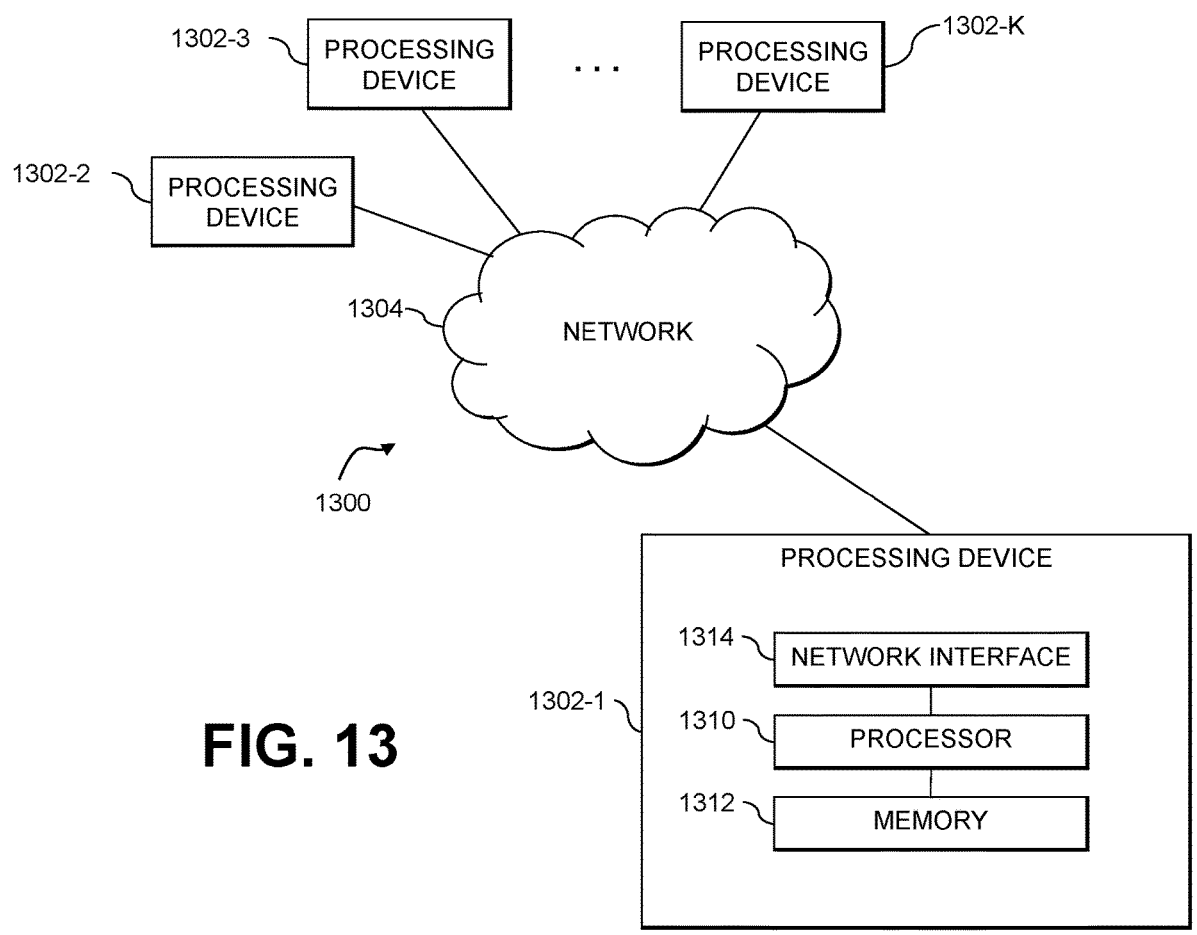

FIG. 12 shows an example processing platform comprising cloud infrastructure 1200. The cloud infrastructure 1200 comprises a combination of physical and virtual processing resources that may be utilized to implement at least a portion of the information processing system 100 in FIG. 1. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for controlling deployment of software applications based on an evaluated risk that the software applications will lead to exposure of one or more designated types of data as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
      to monitor data exchanged with a given piece of software, the monitored data comprising at least one of one or more requests sent from one or more clients to the given piece of software and one or more responses sent from the given piece of software to the one or more clients;
      to generate at least one data structure characterizing whether one or more designated types of data are included in the monitored data, the generated at least one data structure comprising one or more entries, a given one of the one or more entries comprising information characterizing at least one of the one or more requests and the one or more responses in which at least one of the one or more designated types of data is determined to be included;
      to evaluate a risk of exposure of the one or more designated types of data by parsing at least a portion of the generated at least one data structure; and
      to control deployment of the given piece of software in a given operating environment based at least in part on the evaluated risk of exposure of the one or more designated types of data.

2. The apparatus of claim 1 wherein the data exchanged with the given piece of software is monitored while the given piece of software is running in a first operating environment, and wherein the given operating environment comprises a second operating environment different than the first operating environment.

3. The apparatus of claim 2 wherein the first operating environment comprises a non-production environment and the second operating environment comprises a production environment.

4. The apparatus of claim 2 wherein the first operating environment is accessible to a first set of users trusted by an entity running the given piece of software, and wherein the second operating environment is accessible to a second set of users not trusted by the entity running the given piece of software.

5. The apparatus of claim 2 wherein the first operating environment comprises a private operating environment controlled by an entity running the given piece of software, and wherein the second operating environment comprises a public operating environment not controlled by the entity running the given piece of software.

6. The apparatus of claim 1 wherein monitoring the data exchanged with the given piece of software comprises utilizing a reverse proxy with which the given piece of software is registered, the reverse proxy being configured to intercept the one or more requests sent from the one or more clients to the given piece of software and the one or more responses sent from the given piece of software to the one or more clients.

7. The apparatus of claim 1 wherein the one or more designated types of data comprises sensitive information which, if exposed, results in a data breach.

8. The apparatus of claim 1 wherein the one or more designated types of data comprises at least one of personally identifiable information, asset identification information, and financial information.

9. The apparatus of claim 1 wherein generating the data structure comprises:
   identifying a presence of one or more attribute values, in bodies of the one or more requests sent from the one or more clients to the given piece of software and the one or more responses sent from the given piece of software to the one or more clients, which correspond to at least one of a set of one or more designated application parameters; and
   performing pattern matching for the identified one or more attribute values, the pattern matching utilizing a set of rules for evaluating whether the identified one or more attribute values comprise any of the one or more designated types of data.

10. The apparatus of claim 9 wherein identifying the presence of the one or more attribute values which correspond to at least one of the set of one or more designated application parameters comprises applying a fuzzy matching algorithm for a set of keywords associated with the set of one or more designated application parameters.

11. The apparatus of claim 10 wherein the set of keywords associated with the set of one or more designated application parameters comprise, for a given application parameter, two or more different keywords which map to the given application parameter.

12. The apparatus of claim 1 wherein evaluating the risk of exposure of the one or more designated types of data comprises parsing the generated data structure utilizing an application name of the given piece of software and a date parameter which filters the entries of the data structure based on a last commit date of the given piece of software.

13. The apparatus of claim 1 wherein controlling deployment of the given piece of software in the given operating environment comprises preventing deployment of the given piece of software in the given operating environment responsive to determining that the evaluated risk of exposure of the one or more designated types of data exceeds a designated risk threshold.

14. The apparatus of claim 1 wherein controlling deployment of the given piece of software in the given operating environment comprises generating one or more warning notifications responsive to determining that the evaluated risk of exposure of the one or more designated types of data exceeds a designated risk threshold.

15. A computer program product comprising a non-transitory processor-readable storage medium having stored therein program code of one or more software programs, wherein the program code when executed by at least one processing device causes the at least one processing device:
   to monitor data exchanged with a given piece of software, the monitored data comprising at least one of one or more requests sent from one or more clients to the given piece of software and one or more responses sent from the given piece of software to the one or more clients;
   to generate at least one data structure characterizing whether one or more designated types of data are included in the monitored data, the generated at least one data structure comprising one or more entries, a given one of the one or more entries comprising information characterizing at least one of the one or more requests and the one or more responses in which at least one of the one or more designated types of data is determined to be included;
   to evaluate a risk of exposure of the one or more designated types of data by parsing at least a portion of the generated at least one data structure; and
   to control deployment of the given piece of software in a given operating environment based at least in part on the evaluated risk of exposure of the one or more designated types of data.

16. The computer program product of claim 15 wherein the data exchanged with the given piece of software is monitored while the given piece of software is running in a first operating environment, and wherein the given operating environment comprises a second operating environment different than the first operating environment.

17. The computer program product of claim 16 wherein the first operating environment comprises a non-production environment and the second operating environment comprises a production environment.

18. A method comprising:
   monitoring data exchanged with a given piece of software, the monitored data comprising at least one of one or more requests sent from one or more clients to the given piece of software and one or more responses sent from the given piece of software to the one or more clients;
   generating at least one data structure characterizing whether one or more designated types of data are included in the monitored data, the generated at least one data structure comprising one or more entries, a given one of the one or more entries comprising information characterizing at least one of the one or more requests and the one or more responses in which at least one of the one or more designated types of data is determined to be included;
   evaluating a risk of exposure of the one or more designated types of data by parsing at least a portion of the generated at least one data structure; and
   controlling deployment of the given piece of software in a given operating environment based at least in part on the evaluated risk of exposure of the one or more designated types of data;
   wherein the method is performed by at least one processing device comprising a processor coupled to a memory.

19. The method of claim 18 wherein the data exchanged with the given piece of software is monitored while the given piece of software is running in a first operating environment, and wherein the given operating environment comprises a second operating environment different than the first operating environment.

20. The method of claim 19 wherein the first operating environment comprises a non-production environment and the second operating environment comprises a production environment.

* * * * *